United States Patent
Ernst et al.

(10) Patent No.: US 6,522,250 B1
(45) Date of Patent: Feb. 18, 2003

(54) MOVEMENT HISTORY BASED SELECTIVE DISTRIBUTION OF GENERALLY BROADCAST INFORMATION

(75) Inventors: Darrell E. Ernst, Leesburg, VA (US); James W. Marshall, Purcellville, VA (US)

(73) Assignee: The Mitre Corporation, McLean, VA (US)

( * ) Notice: Subject to any disclaimer, the term of this patent is extended or adjusted under 35 U.S.C. 154(b) by 0 days.

(21) Appl. No.: 09/928,305

(22) Filed: Aug. 14, 2001

(51) Int. Cl.[7] .............................................. H04Q 7/00
(52) U.S. Cl. ...................... 340/539; 340/989; 340/991; 340/992; 340/996; 340/993; 340/825.36
(58) Field of Search ........................ 340/539, 825.36, 340/7.2, 7.51, 7.52, 7.55, 7.58, 7.61, 988, 989, 991, 992, 993, 994, 996; 375/259

(56) References Cited

U.S. PATENT DOCUMENTS

| | | |
|---|---|---|
| 4,860,352 A | 8/1989 | Laurance et al. |
| 4,993,067 A * | 2/1991 | Leopold ................. 340/825.34 |
| 5,243,652 A | 9/1993 | Teare et al. |
| 5,636,245 A * | 6/1997 | Ernst et al. .................. 340/988 |
| 6,028,514 A | 2/2000 | Lemelson et al. |
| 6,084,510 A | 7/2000 | Lemelson et al. |
| 6,252,544 B1 * | 6/2001 | Hoffberg ................. 342/357.1 |

* cited by examiner

*Primary Examiner*—Daniel J. Wu
*Assistant Examiner*—Daniel Previl
(74) *Attorney, Agent, or Firm*—Larson & Taylor, PLC

(57) ABSTRACT

A message filtering system is provided for filtering generally broadcast messages received by a movable unit. The generally broadcast message includes an information segment including location, time and/or velocity information relating to an event of potential interest to the unit which has occurred in the past and which has continuing consequences for the unit. The movement history of the unit is stored along with data selection information and a determination is made as to whether the information contained in the broadcast information segment is of interest based on this stored information.

4 Claims, 1 Drawing Sheet

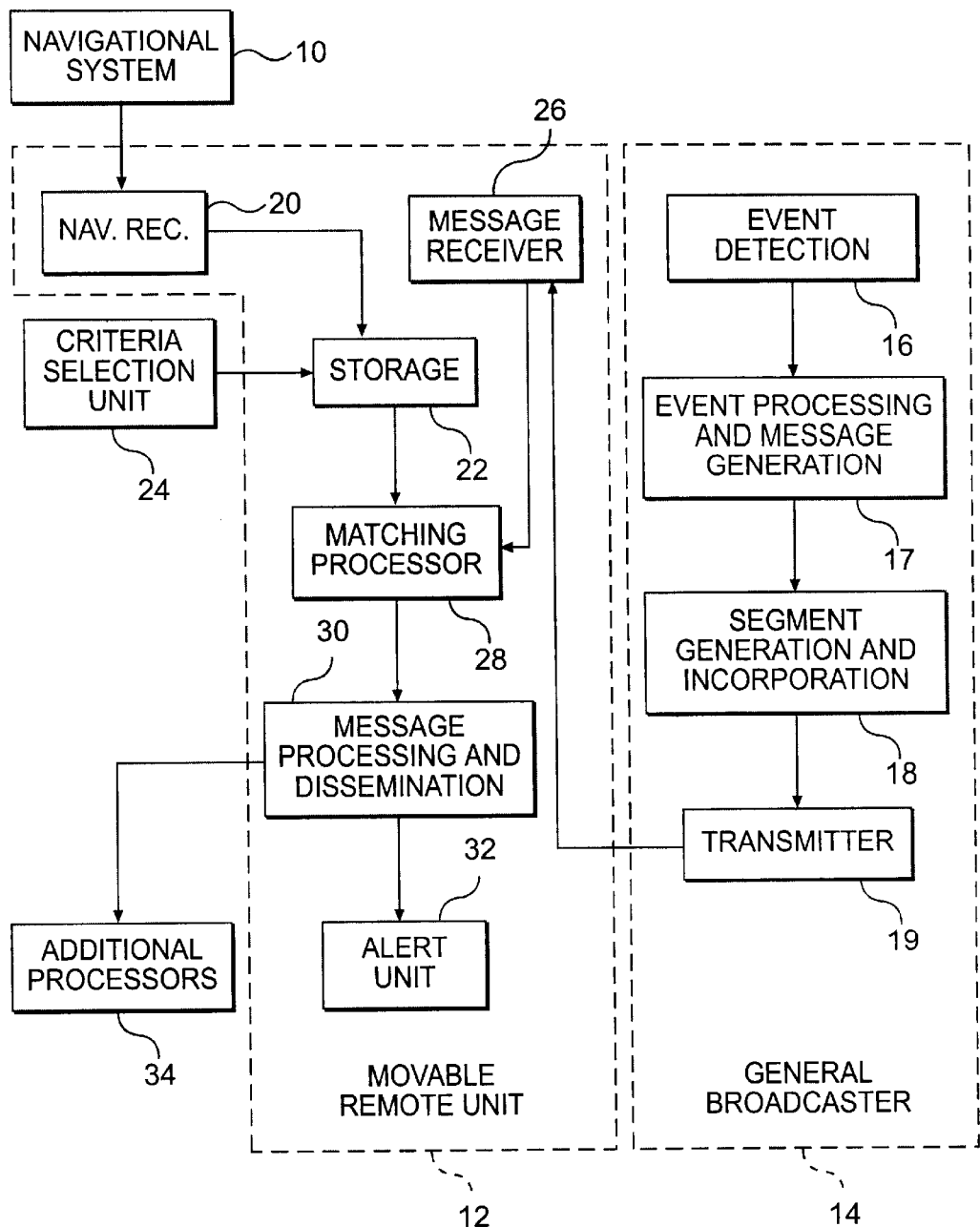

MOVEMENT HISTORY BASED SELECTIVE DISTRIBUTION OF GENERALLY BROADCAST INFORMATION

BACKGROUND OF THE INVENTION

1. Field of the Invention

The present invention relates to filtering of generally broadcast messages which are processed based on the applicability of the message to the receiver of the message and, more particularly, to a system which provides such filtering based on the past movement history of a movable receiver so as to alert the receiver to, for example, potentially dangerous situations to which the receiver may have been exposed.

2. Related Art

As discussed in commonly assigned U.S. Pat. No. 5,636,245, to Ernst et al, region-specific information is, in general, disseminated by predetermined point-to-point communication or by a general broadcast which must be manually monitored in order to extract information peculiar to a position, velocity and time of interest. For example, marine weather data is continuously broadcast and mariners must monitor the broadcast for long periods of time in order to obtain the information peculiar to their region. Even then, the exact region affected may require computation or may be ambiguously defined. There is also the possibility that the user may miss information of interest because he or she occupies an unknown location, is unfamiliar with the region, or uses a different frame of reference, among other reasons.

Another example is tactical ballistic missile (TBM) warning, which is derived from space and ground based sensor data, and is provided through a variety of broadcast and general purpose communications systems to a small subset of in-theater forces. Currently, such warning requires transportable processing stations that can generate information about specific situations in the field but cannot directly communicate with all individuals affected. The timeliness, reliability, and dispersion of information under these conditions are of concern. Because warning is in the form of geographical coordinates and time of predicted impact, users must interpret the data to determine if the warning affects them.

Some current commercial systems are using Global Positioning System (GPS) information to select relevant data from computer based files such as appropriate electronically stored maps for use in automobiles. These are useful for relatively static information but fail to address dynamic environmental or combat factors.

U.S. Pat. No. 5,243,652 to Teare et al discloses a database access system in which each mobile user has a positioning system which transmits position information to a central facility. This central facility then grants or denies database access depending on the geographical location of the mobile user.

U.S. Pat. No. 4,860,352 to Laurance et al discloses a system in which a satellite system determines the position of a transmitter at a first location and a receiver at a second location. The transmitter position is appended to the received message which is sent by the satellite system to the receiver. The receiver receives the appended message, extracts the transmitter position data and compares the extracted transmitter position with a stored transmitter position. If the positions correlate, the receiver knows it has received an authentic message.

The above-mentioned U.S. Pat. No. 5,636,245 concerns an improvement over these prior art systems and discloses a filtering system which determines whether generally broadcast information is relevant to a particular user based on the location, velocity and/or time of an object or event of interest. The system includes a general broadcasting unit comprising a transmitter for broadcasting messages including an information segment comprising a region, velocity and/or a time corresponding to an event. A remote unit includes a receiver for receiving the broadcast messages and storage means for storing spatial position information relating to the remote unit and/or a further remote region of interest to the remote unit, as well as storing data selection information. The stored data selection information is related to information contained in the broadcast segment and is compared with the latter in the matching processor and used, along with spatial position information, to determine whether a match condition is satisfied. If so, the message is disseminated, e.g., an alarm is sounded and the message is displayed.

A number of patents of potential relevance have issued subsequent to U.S. Pat. No. 5,636,245, including the following: U.S. Pat. Nos. 6,028,514 and 6,084,510 to Lemelson et al; U.S. Pat. No. 6,111,521 to Mulder et al; U.S. Pat. No. 5,635,924 to Tran et al; U.S. Pat. No. 5,898,680 to Johnstone et al; U.S. Pat. No. 6,159,894 to McCormick et al and U.S. Pat. No. 5,764,657 to Jones.

SUMMARY OF THE INVENTION

In accordance with the invention, a discriminating or filtering system is provided which addresses an important problem that is not addressed by the prior art, including the various patents discussed above. More specifically, the prior art is concerned with the present effect of events or, in some instances, with the predicted effect of future events. However, there are a number of situations wherein the past effect of an event is important. For example, where there has been a spill or other release of a toxic chemical or the deployment of a biological weapon such as a poisonous gas, it is important to know not only if a movable remote unit is located in a region of danger or is heading for such a region, but also if the unit has been in that region at any time during the travel history of the unit. In this regard, although the remote unit may be out of danger now and heading away from danger, the remote unit may have been unknowingly exposed to the toxic threat at a previous time during the travel of the unit. This determination may also be complicated by the fact that the threat itself has moved or spread from its initial site, i.e., toxic fallout or noxious gases may have spread, so that the time and location of the original release and the rate (velocity) of the spread must be taken into consideration in determining whether there has been harmful exposure.

In accordance with one aspect of the invention, a message filtering system is provided for filtering generally broadcast messages received by a movable unit, said system comprising a receiver for receiving a generally broadcast message including an information segment comprising at least one of a location, a velocity and a time relating to an event of potential interest to the movable unit which has occurred in the past and which has continuing consequences for the movable unit; spatial position input means for inputting spatial position information relating to said remote unit during the movement of the remote unit; storing means for storing said spatial position information so that a history is provided of the movement of the remote unit and for storing data selection information related to information contained in said information segment of the generally broadcast message used in determining whether, based on the information contained in said information segment and the stored history of movement of the movable unit, the broadcast message is of interest to the movable unit; a matching processor connected to said storing means and to said receiver for comparing said information segment with said data selection information and said history of movement of the movable unit to determine whether a match condition is satisfied and for, when a match condition is satisfied, outputting a match signal; and disseminating means for, responsive to receiving said match signal, processing and disseminating said broadcast message.

In situations wherein the information segment of the broadcast message contains time-location information relating to both the time of the event and the location of the event, the matching processor preferably compares said time-location information with said stored history of movement of the unit and said stored data selection information.

In situations wherein the event is a toxic event having toxic effects that spread from the original location of the event and the information segment contains toxic event information relating to the time of the original event, original location of the event, the velocity of spread of the event, the matching processor compares said toxic event information with the stored history of movement of the unit and the stored data selection information.

In accordance with a further aspect of the invention, a communication system is provided which comprises a general broadcasting unit comprising: a message generating means for generating a generated message related to detection of a toxic event occurring in the past and having continuing consequences; a segment generating means for generating an information segment comprising at least one of a region, a velocity and a time relating the event, and for incorporating said information segment into said generated message to produce an outputted message, and a transmitter for broadcasting said outputted message; and a movable remote unit comprising: a receiver for receiving said outputted message from said transmitter of said general broadcasting unit; spatial position input means for inputting spatial position information relating to said remote unit during movement of the remote unit; a storing means for storing said spatial position information so that a history is provided of the movement of the remote unit and for storing data selection information related to information contained in said information segment used in determining whether because of any one of the region of the event, the velocity of toxic effects associated with the event and the time of the event, the event has posed a threat to the remote unit by virtue of exposure of the remote unit to said toxic effects during the history of the movement of the remote unit; a matching processor connected to said storing means and to said receiver for comparing said information segment in said outputted message with said spatial position information and said data selection information stored in said storing means to determine whether a match condition is satisfied, and for, when a match condition is satisfied, outputting a match signal, and a disseminating means for, responsive to receiving said match signal, processing and disseminating said message in accordance with said match signal.

Other features and advantages of the invention will be set forth in, or will be apparent from, the detailed description of the preferred embodiments which follows.

BRIEF DESCRIPTION OF THE DRAWING

The invention will be described below in further detail with reference to the accompanying drawings wherein, FIG. 1 is a block diagram of a system according to the present invention.

DESCRIPTION OF THE PREFERRED EMBODIMENTS

As indicated above, the present invention is directed to a system which determines whether access to particular information transmitted by a broadcaster is appropriate for a particular movable unit remote from the broadcaster based on the history of the past movement of the unit. The invention is particularly useful in implementing a system for distributing situation awareness information with respect to exposure of the remote movable unit to situations of interest including, e.g., toxic events, during the travel of the remote unit. The present invention can use satellite provided services, such as the GPS, to acquire data and establish user relevance based on current location in real time.

As described in the above-mentioned U.S. Pat. No. 5,636, 245, situation awareness encompasses understanding of factors within the operational environment which might affect the manner in which the user proceeds. Some specific examples of functions that could be supported by the system of the present invention include the following:

A. Alert the user that the user has been exposed to a toxic substance or biological hazard sometime during their past travels. This would be helpful in situations where the danger is to the user as well as where the user, although personally safe, may be a carrier. The hazard could be intentional or unintentional. The past exposure could be because the user was moving and/or because the toxin was moving.

B. Alert people/companies that their harvested crops, livestock, other possessions or like movable property, have been exposed to toxins or biological hazards during movement thereof. This would, of course, require that the movable property have its location tracked during movement thereof.

C. Alerting the user to the possibility of food poisoning, with the message being directed to those users who ate at a particular restaurant at a particular time.

D. If there has been a crime, alert the users who may have been in the area of the crime at the time of the crime, with the hope that someone may have information that could help solve the crime.

E. Alert users who bought lottery tickets at a particular store at a particular time that they may be the winner.

F. Help users find out news about an event about which they may be interested because of where they were during past travels. For example, the system could be used in a situation where one sees a bad crash on the highway and is interested in finding out the fate of those involved in the crash. The system would broadcast information directed at those in the vicinity at the time of the crash or during crash clean-up.

G. Provide notice to users of certain types of restitution or reimbursement. For example, this notice could involve insurance settlements for vehicles damaged by hail.

H. Alert users as to possible exposure to persons with various types of communicable diseases.

I. Provide targeted advertising that gives consumers or potential buyers information about products or services that may be of particular interest to them because of the access history of their location, for example, where to buy a sunburn treatment for those who were at the beaches.

In many of these examples, the information provided might also include appropriate situation-specific actions the user might take. Further it should be evident that the "movable unit" whose movement history is tracked can simply be a suitable receiver system or unit carried by, or on the person of an individual user.

This capability can be implemented on any hardware platform that interfaces with a global positioning or navigation system or other positioning/navigational inputs, and provides world-wide communications connectivity with the sources of the situation alert bulletins. Remote units that receive, process, and display or operate on the situation awareness information can be mobile or transportable.

One preferred embodiment of the system of the present invention is shown in FIG. 1. The units of this embodiment are basically the same as or the embodiments are similar to those of the above-mentioned U.S. Pat. No. 5,636,245 and the differences will be addressed below. In the preferred embodiment illustrated, a navigation system 10 is provided which may be, for example, Loran or GPS, or any other source of navigational information, e.g., position, velocity or time. The present invention may operate with either periodic or continuous information delivery systems. On the other hand, in many applications a navigation system may not be necessary, i.e., an on-board system (not shown) carried by the movable unit, which is denoted 12, can be used to track the travel history of unit 12.

A general broadcaster 14 is provided which includes an event detection unit 16 which detects an event. Examples of events to be detected with a suitable detection unit 16 includes toxic events such as chemical spills and nuclear, biological, chemical (NBC) events, criminal activity and others mentioned above. It is to be understood that detection unit 16 may detect the event directly itself or may receive a detection signal from an external source. Once detection unit 16 detects an event, it outputs information to an event processing and message generation unit 17. Message unit 17 outputs a message generated in response to the event detection output of detection unit 16 to a segment generation and incorporation unit which maybe a separate unit or part of unit 17, i.e., programmable part of a computer unit. Incorporation unit 18 then defines a position, a velocity and a time of occurrence or a time of effectiveness for a particular message based, e.g., on a projected history of the event, and incorporates this information as a segment in the message. For time critical applications, the time of effectiveness may be set to the same universal clock unit used in navigational (positioning) system 10. The segment may also advantageously include an event specific tag which indicates the type of event detected. This segment may be, for example, a header or a footer on the message. The message containing the segment is then transmitted by a transmitter 19 of the general broadcaster 14.

The movable remote unit 12 mentioned above includes a navigational receiver 20 for receiving various information, including navigational information, from navigating system 10. A storage unit 22 stores position, velocity and/or time information acquired from navigating system 10 by navigational receiver 20 and/or other selection criteria inputs from a selection criteria input unit 24 which may provide manual inputting of selection criteria. The selection criteria input may include other positions, velocities and/or times to increase the amount of information disseminated, as well as event specific tags to customize and reduce the amount of information disseminated. This information provides the basis for defining matching conditions of interest to the user of remote unit 12. It will be appreciated that there may be a plurality of remote units 12, all receiving information from positioning system 10 and broadcaster 14.

A message receiver 26 receives messages transmitted by broadcaster 14. It should be noted that for some applications, the navigation system 10 may serve as the general broadcaster. In such applications, the navigational receiver 20 would serve as the message receiver. In the embodiment of FIG. 1, after receiving a broadcaster message, receiver 26 then outputs this message to a matching processor 28. Matching processor 28 compares the information contained in the segment of the message to the information stored in storage or memory unit 22. If the stored position, velocity and/or time information and the stored movement history of unit 12 are within matching conditions of the position, velocity and/or time information for the segment of the transmitted message, then a message processing and dissemination unit 30 will process and disseminate the information in the message. The matching conditions typically consist of an appropriate position and time window such that exact correlation is not required. Further, information at other regions of interest may be processed by storing additional times, velocities and/or positions, e.g., time, velocity and/or position information based on the past movement history of remote unit 10 or based on the past movement history of other remote units of interest. Additionally, matching processor 28 may compare any event specific tags included in the segment with any event specific tags either stored in matching processor 28 and/or input at criteria selection unit 24 and only allow messages having appropriate event specific tags to be processed and disseminated by unit 30.

Generally speaking, one correlating requirement is a set of the following: a user-specified radial distance to the event, information as to whether the user has been heading toward or away from an event area, information as to whether the event is past or present relative to the user, the duration of the event and, for some events, the range or amount of spread of the events of the event. Alternatively, the matching processor 28 could contain the criteria for predefined event types, with appropriate segments, being generated by unit 18 in general broadcaster 14. Specific examples of matching conditions would include the following: whether a combatant had been within the circular error probable (CEP) range of impacting ballistic missile which has resulted in or triggered a toxic event having continuous or ongoing effects; whether the remote user has been within the path of an NBC cloud; or whether the path of the remote user has previously intersected other events of consequence or interest to the remote user.

Considering a specific example, assume that a terrorist group secretly releases a toxic substance at a crowded subway station. The toxin has long-term effects and the release of the substance is not immediately recognized. Thereafter, people exposed to the toxin start to show symptoms, get medical attention, and are treated. As a result, the real threat is recognized and search is made for the toxin source. As a result of this search, health officials find the toxin release device in the subway station and determine when the toxin was dispersed. This activity corresponds to the event detection represented by block 16 of the drawings.

Based on the known time and location of the release and the type of the toxin, a broadcast message is generated that provides details of the threat and instructions for seeking medical treatment. The message is formatted for transmission using the broadcast system of the invention. The message contains the location of the toxin release, the size of the affected area, and the times during which exposure may have caused problems. This activity is represented by blocks 17, 18 and 19 of the general broadcaster 14, with broadcasting of the message being carried out using transmitter 19.

The broadcast message is received by the user-end equipment of the movable remote unit 12, viz., receiver 26. The movable remote unit 12 operates continuously and, as indicated above, also includes a navigation receiver 20, which determines the location of the remote unit 12 from the navigational system 10. As the remote unit 12 moves, the storage unit or memory 22 collects and maintains a history of the location of the remote unit 12. This location history is correlated to time, so that the location of the remote unit 12 at a particular time in the past can always be accessed. The matching processor 28 of remote unit 12 compares the broadcast message received by the message receiver 26 to the complete location history stored in storage unit 22. When this comparison is carried out by the matching processor 28, a "match" may be identified in some cases. Such a match indicates that the mobile unit 12 was in the affected area during the time when exposure was possible.

If a match occurs, message processing is initiated by message processing and dissemination unit 30. If a match does not occur, there is no further message processing. Message processing could include formatting the message for display by an alert unit 32. Additional processors 34 could also be alerted.

Dissemination may include an audio, tactile or visual alarm or display, or any combination thereof, using alert unit 32 and may be provided to one or more users. Dissemination may also include further processing at the processing unit 30 or at additional processing devices 34.

Although the invention has been described above relative to exemplary preferred embodiments thereof, it will be understood by those skilled in the art that variations and modifications can be effected in these embodiments without departing from the scope and spirit of the invention.

What is claimed is:

1. A message filtering system for filtering generally broadcast messages received by a movable unit, said system comprising:

a movable unit which is movable so as to have a past movement history;

a receiver for receiving a generally broadcast message including an information segment comprising at least one of a location, a velocity and a time relating to an event of potential interest to the movable unit which has occurred in the past and which has continuing consequences for the movable unit because of the past movement history of the movable unit;

spatial position input means for inputting spatial position information relating to said movable unit during the movement of the movable unit;

storing means for storing said spatial position information so that a history is provided of the movement of the movable unit and for storing data selection information related to information contained in said information segment of the generally broadcast message used in determining whether, based on the information contained in said information segment relating to the past event and the stored history of movement of the movable unit, the broadcast message is of interest to the movable unit;

a matching processor connected to said storing means and to said receiver for comparing the information contained in said information segment relative to the past event with said data selection information and said history of movement of the movable unit to determine whether a match condition is satisfied and for, when a match condition is satisfied, outputting a match signal; and disseminating means for, responsive to receiving said match signal, processing and disseminating said broadcast message.

2. A message filtering system according to claim 1 wherein the information segment of the broadcast message contains time-location information relating to both the time of the event and the location of the event and said matching processor compares said time-location information with said stored history of movement of the unit and said stored data selection information.

3. A message filtering system according to claim 1 wherein said event is a toxic event having toxic effects that spread from the original location of the event and said information segment contains toxic event information relating to the time of the original event, original location of the event, the velocity of spread of the event and wherein said matching processor compares said toxic event information with said stored history of movement of the unit and said stored data selection information.

4. A communication system comprising: a general broadcasting unit and a movable remote unit which is movable so as to have a past movement history;

said general broadcasting unit comprising:

a message generating means for generating a generated message related to detection of a toxic event occurring in the past and having potential continuing consequences for the remote unit because of the past movement history of the remote unit;

a segment generating means for generating an information segment comprising at least one of a region, a velocity and a time relating to the past event, and for incorporating said information segment into said generated message to produce an outputted message, and a transmitter for broadcasting said outputted message; and said movable remote unit comprising:

a receiver for receiving said outputted message from said transmitter of said general broadcasting unit;

spatial position input means for inputting spatial position information relating to said remote unit during movement of the remote unit;

a storing means for storing said spatial position information so that a history is provided of the past movement of the remote unit and for storing data selection information related to information contained in said information segment used in determining whether because of any one of the region of the past event, the velocity of toxic effects associated with the past event and the time of the past event, the past event has posed a threat to the remote unit by virtue of exposure of the remote unit to said toxic effects during the history of the movement of the remote unit;

a matching processor connected to said storing means and to said receiver for comparing information in said information segment in said outputted message relating to the past toxic event with said spatial position information relating to the past movement history of the remote unit and said data selection information stored in said storing means to determine whether a match condition is satisfied, and for, when a match condition is satisfied, outputting a match signal, and a disseminating means for, responsive to receiving said match signal, processing and disseminating said message in accordance with said match signal.

\* \* \* \* \*